United States Patent

Ballinger

[15] 3,662,398

[45] May 9, 1972

[54] MAGNETIC RECORDING APPARATUS

[72] Inventor: Dale O. Ballinger, Denver, Colo.

[73] Assignee: Honeywell Inc., Minneapolis, Minn.

[22] Filed: Sept. 25, 1969

[21] Appl. No.: 861,065

[52] U.S. Cl. ..........346/74 MP, 179/100.2 CB, 179/100.2 E, 346/74 M

[51] Int. Cl. ......................................G03g 19/00, G11b 5/86

[58] Field of Search..............346/74 MP, 74 M, 135; 324/38, 324/43; 178/6.6 TP, 6.6 A, 7.3 D, 7.5 D; 340/173 LM, 174.1 MO; 117/36.1; 179/100.2 CB, 100.2 D, 100.2 E

[56] References Cited

UNITED STATES PATENTS

| | | | |
|---|---|---|---|
| 2,943,141 | 6/1960 | Knight | 178/6.6 A |
| 3,171,106 | 2/1965 | Lemmond | 178/6.6 TP |
| 3,219,763 | 11/1965 | Uemura | 179/100.2 CB |
| 3,221,315 | 11/1965 | Brown | 346/135 |
| 3,277,244 | 10/1966 | Frost | 179/100.2 E |
| 3,439,918 | 4/1969 | Walter | 179/100.2 E |
| 3,482,969 | 12/1969 | Ewing | 178/6.6 TP |

*Primary Examiner*—Howard W. Britton

*Attorney*—Arthur H. Swanson and Lockwood D. Burton

[57] ABSTRACT

A magnetic recording apparatus is shown including a magnetic transducer that records an input signal upon a thin magnetic film of material having a high remanence which is rotatively mounted upon a drum or belt. The magnetic film contacts a magnetic recording paper which responds to the recorded input signal thereon for displaying that signal as a recording upon the surface of the paper. The film is then erased and made ready for subsequent contact with the magnetic transducer.

3 Claims, 14 Drawing Figures

INVENTOR.
DALE O. BALLINGER
BY M. Michael Carpenter
ATTORNEY.

INVENTOR.
DALE O. BALLINGER
BY M. Michael Carpenter
ATTORNEY.

MAGNETIC RECORDING APPARATUS

The present invention relates to a magnetic recording apparatus; and, more particularly, to a high speed recording apparatus which is capable of recording and visually displaying an input signal upon a magnetic recording medium.

It is known in the prior art to utilize a magnetizable cylinder upon which a magnetic head records an input signal. The magnetized cylinder then attracts a toning powder which, in turn, transfers to a recording paper for recording the input signal thereon. An even better known prior art method of reproducing an input signal utilizes an electrostatically chargeable drum which attracts a toner and then transfers the toner to a treated recording paper. These devices require the utilization of a toning powder which creates a maintenance and a handling problem as well as other problems commonly associated therewith.

Accordingly, it is an object of the present invention to provide an improved recording apparatus capable of recording an input signal upon a recording medium.

It is another object of the present invention to provide a recording apparatus wherein an input signal may be recorded and visually displayed upon a recording medium in the form of an analog signal without requiring moving parts except to move the medium.

Still another object of the present invention is to provide a recording apparatus which will record a positive trace upon a magnetically sensitive recording medium.

A further object of the present invention is to provide an improved high speed recording apparatus which is capable of recording a positive analog trace upon a magnetically sensitive recording medium.

Still a further object of the invention herein presented provides for a recording apparatus which records an input signal without requiring a toning powder or a photographic process.

Yet another object of this invention is to provide a magnetic recording apparatus which is capable of recording and visually displaying a plurality of input signals upon a recording medium and which is capable of providing for fault recording.

In accomplishing these and other objects, there has been provided a magnetic transducer which engages a magnetic film of material having a high remanence for recording an input signal thereon. The film then engages a magnetically sensitive recording medium for transferring the input signal thereto. The magnetic film is then erased prior to passing over the magnetic transducer for continuing the recording process.

Other objects and many of the attendant advantages of the present invention will become readily apparent to those skilled in the art as a better understanding thereof is obtained by reference to the following description when considered in connection with the accompanying drawings, wherein.

Figures 3, 4:
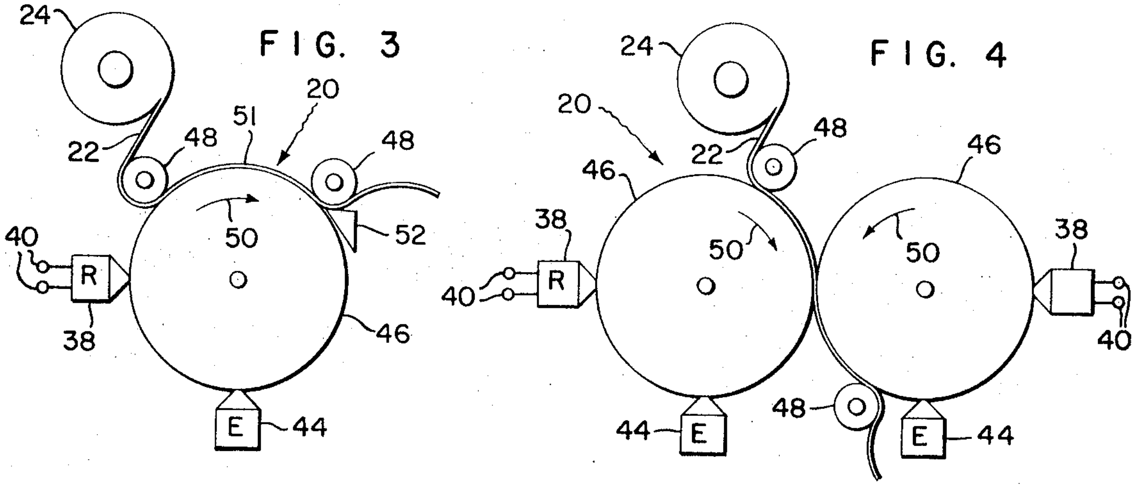
FIG. 3 is a side view, showing a second embodiment of the present invention.
FIG. 4 is a side view, similar to FIG. 3, capable of recording more than one trace upon the recording medium of the present invention.
Figures 5, 6, 7, 8, 9, 10, 11, 12, 13, 14:
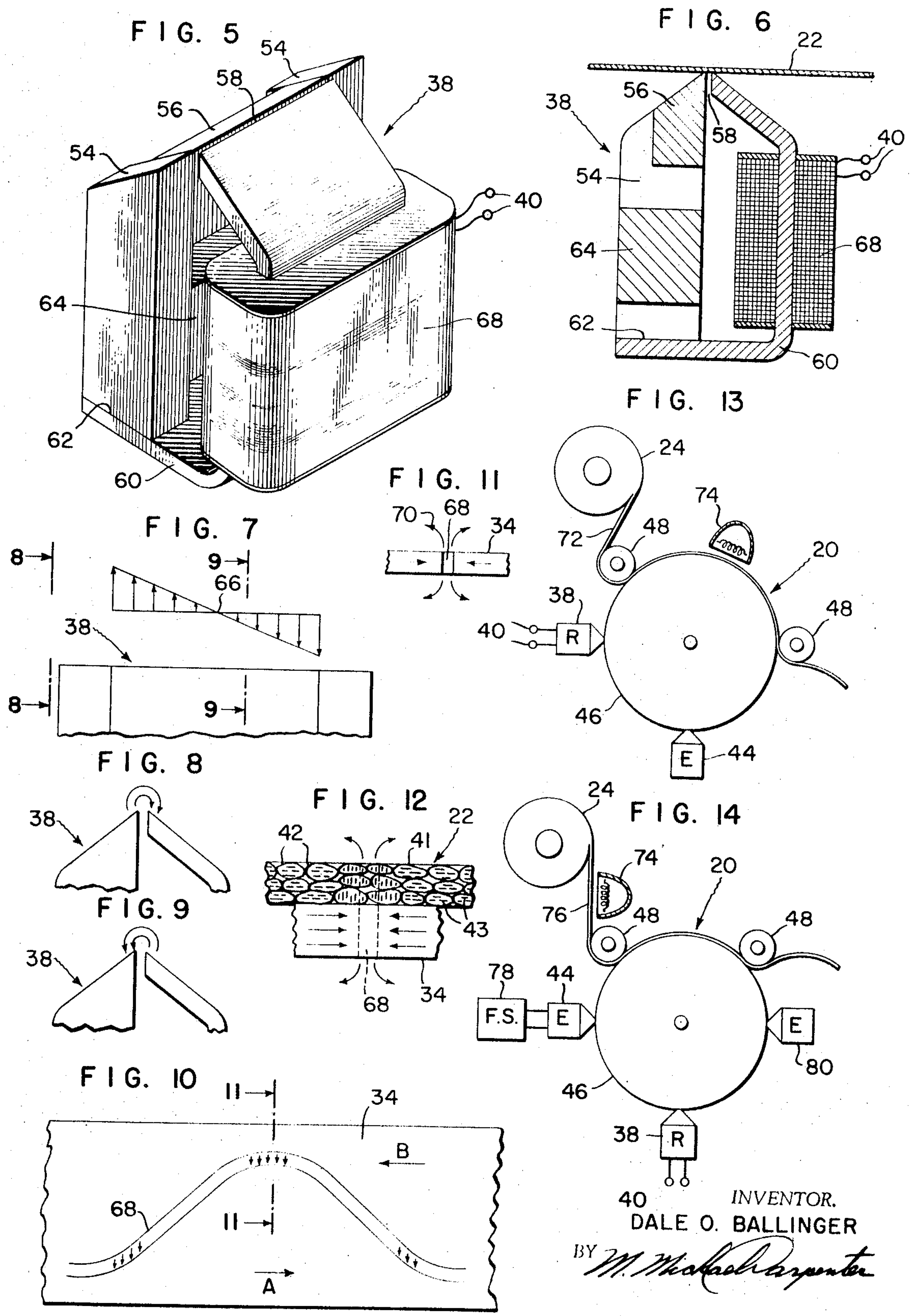
FIG. 5 is a perspective view showing a magnetic transducer particularly useful within the present invention.
FIG. 6 is a cross-sectional view, showing the magnetic transducer of FIG. 5.
FIG. 7 is a graphical representation of the flux distribution of the transducer shown in FIG. 6.

FIGS. 8 and 9 are cross-sectional views taken along lines 8—8 and 9—9, respectively, of FIG. 7;

FIG. 10 shows a magnetic film which contacts the magnetic transducer of FIGS. 5 and 6;

FIG. 11 is a cross-sectional view taken along lines 11—11 of FIG. 10;

FIG. 12 is a cross-sectional view showing the recording medium of the present invention contacting the magnetic film of FIG. 10;

FIG. 13 is a side view, similar to FIG. 3, showing an embodiment useful with a thermosetting recording medium; and FIG. 14 is a cross-sectional view, similar to FIG. 13, showing an embodiment useful with a thermoplastic recording medium.

Figure 1:
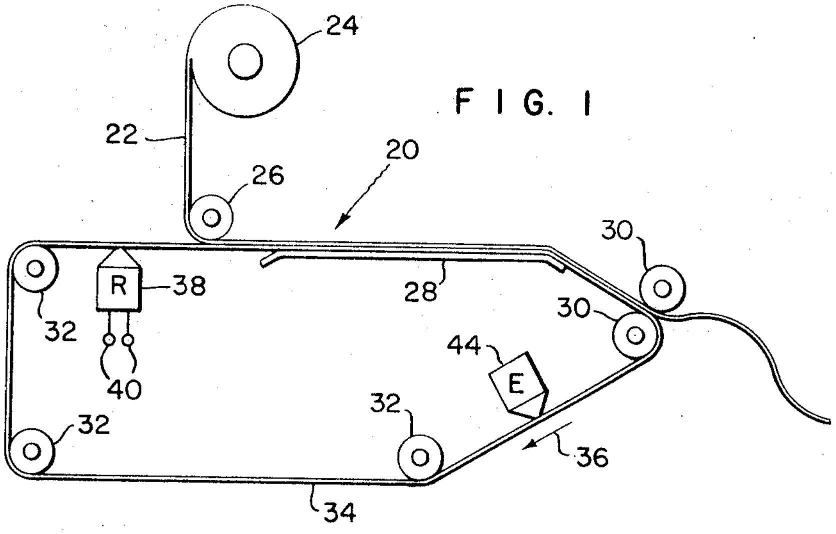
FIG. 1 is a side view schematically showing a magnetic recording apparatus of the present invention.

Referring now to the drawings, FIG. 1 shows a magnetic recording apparatus 20 having a magnetic recording medium 22 wound upon a supply reel 24. The magnetic recording medium 22 is drawn over a first guide roller 26 and a platten 28 by the driving action of a pair of pinch rollers 30, driven by a suitable driving motor (not shown). The lowermost pinch roller 30 forms one of a plurality of supporting guides 32 which support a continuous belt 34 of thin magnetic film material having a high remanence. The continuous belt 34 is driven in the direction indicated by arrow 36, by the driving action of the pinch rollers 30, over a recording transducer 38 having input terminals 40 to which the input signal is applied. The recording transducer 38 may include several forms of magnetic recording heads or multiple stylus recording heads presently known. However, in the present embodiment, the recording transducer 38 is formed as a magnetic head capable of producing a null at one point within the recording gap thereof which is located perpendicular to and in contact with the continuous belt 34. The unique magnetic recording head of the present invention is an improvement over previously known "null" type recording heads. This improved "null" head is shown in FIGS. 5 and 6 and will be described in greater detail hereinbelow.

The recording medium 22 takes the form of a recording paper which, in response to a magnetic field, produces a positive trace thereon. One example of such a recording medium is illustrated in my copending patent application entitled "A Recording Medium Responsive to Force Fields" filed May 29, 1969 and bearing Ser. No. 828,993 and now abandoned. A second example of such a medium is illustrated in my copending patent application entitled a "Thermal Sensitive Recording Medium Responsive to Force Fields and Apparatus for Using Same", filed Sept. 25, 1969 and bearing Ser. No. 860,962. The second recording medium is particularly useful within the recording apparatus illustrated in FIGS. 13 and 14 and will be discussed in greater detail hereinbelow.

The first recording medium is illustrated in FIG. 5 and includes a transparent continuous web member 41 having cavities 42 located therein. The cavities contain highly reflective, magnetic flake-like particles 43 which are preoriented within the continuous web member 42 of the recording medium 22 in parallel relation to the plane thereof. Recording upon the recording medium 22 is achieved by first recording upon the continuous belt 34 and then transferring the magnetic signal recorded thereon to the recording medium 22 by reorienting the reflective flake-like particles 43 within the recording medium. The continuous belt 34 is then passed between pinch rollers 30 prior to being drawn across an erase head 44 for removing the recorded signal thereon. This readies the continuous belt 34 for recording a new signal as it passes over the magnetic recording head 38. Thus, continuous recording upon the recording medium 22 is achieved.

Figure 2:
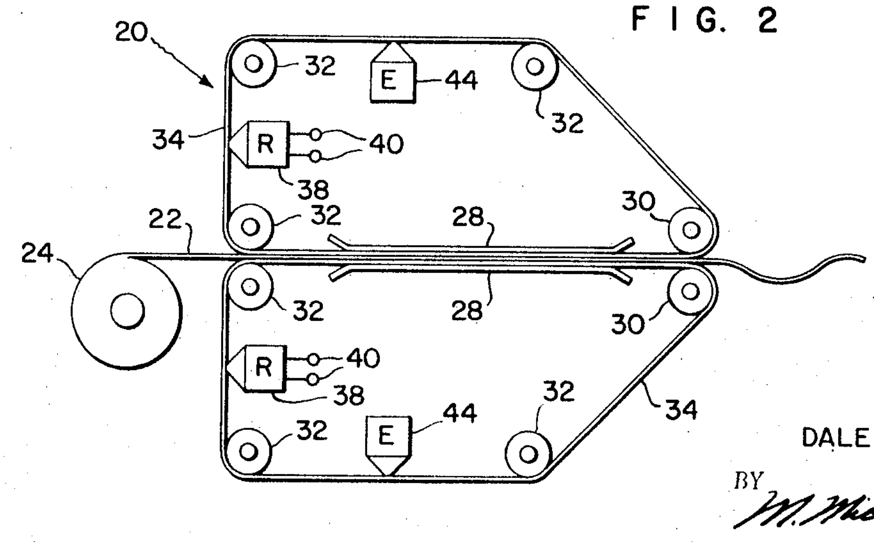
FIG. 2 is a side view, similar to FIG. 1, showing a means for recording more than one trace upon the recording medium of the present invention.

Recording upon the magnetic recording medium 22 containing the highly reflective, magnetic flake-like particles 43 is discussed within my copending patent application Ser. No. 828,993. In FIG. 2, where like numbers have been assigned to like components, two recording trandsucers 38 record upon two continuous belts 34. Each continuous belt 34 contacts each side of the recording medium 22 for reorienting the reflective flake-like particles 43 therein and recording a pair of traces thereon. The recording medium 22 exits the recording apparatus between the pinch rollers 30 while each continuous belt 34 returns across supporting guides 32 to be erased by the erasing heads 44.

In FIG. 3, a third embodiment of the recording apparatus of the present invention is shown. Here, the continuous belt 34 is replaced by a rotating drum 46. The rotating drum is coated with a thin magnetic film material having a high remanence. The recording medium 22 is stored upon a supply reel 24 and drawn therefrom by suitable driving rollers 48 which urge the recording medium 22 against the drum 46 for driving both the recording medium and drum in the direction indicated by arrow 50. As in FIG. 1, the recording head 38 places a signal upon the thin magnetic film of the drum 46. This signal is then transferred to the recording medium 22 between the driving rollers 48. This area may serve as a display area 51 for displaying the recorded input signal. The recording medium is finally removed from the drum by a suitable stop 52 and the signal recorded upon the drum 46 is erased by the erase head 44.

Referring to FIG. 4, an embodiment is shown similar to that of FIG. 3 for recording two input signals upon the single recording medium 22. Here, as in FIG. 2, like numbers denote like devices. The recording medium 22 is drawn from the supply reel 24 and passed between two drums 46 which are rotating in the direction indicated by arrows 50. Each signal applied to the recording heads 38 is recorded on the drums 46 prior to being transferred to the recording medium 22. The recording medium responds to the recording upon the drums 46 by reorienting the flake-like particles 43 therein for producing traces thereon. Each drum 46 is then erased by the erase heads 44 prior to recontacting the recording heads.

FIGS. 5 and 6 illustrate an improved null type magnetic recording head 38. The null type recording head 38 includes a pair of core support members 54 between which a laminated stack of magnetic core material 56 is placed for forming one edge of a recording gap 58. The second edge of the recording gap 58 is formed by the leading edge of one leg of a generally C-shaped core member 60 whose second leg abuts the lower portion of the core support members 54 for forming a back gap 62 therebetween. Located between the core support members 54 is a permanent magnet 64 which provides the magnetic flux for establishing the flux pattern illustrated schematically in FIG. 7. This flux pattern, created by the permanent magnet 64, establishes a central null 66 with the flux on each side thereof directed in opposite directions. This phenomenon is illustrated in FIGS. 8 and 9 which are cross-sectional views taken along lines 8—8 and lines 9—9 of FIG. 7, respectively. The input signal to be recorded is applied to input terminals 40 which connect to a coil 68. As the input signal varies, the current passing through the coil creates a flux within the magnetic head 38 for shifting the null point 66 in FIG. 7 to the right or left, depending on the direction of the input signal.

In the present invention, the recording gap 58 of the null type recording head 38 is as wide as the continuous belt 34 or the drum 46. While most prior art null heads are limited to one-half inch wide, the present invention achieves the under head width by locating a large coil 68 on the center leg portion of the C-shaped core piece 60. This location allows the coil 68 to be produced as large as is necessary to provide the required current and establish the required flux for driving the wider head.

As best seen in FIG. 10, the shift of the null point 66 within the recording gap 58 creates a magnetic field which magnitizes one portion of the continuous belt 34 in the direction indicated by arrow "A" and magnitizes the other portion of the continuous belt in the direction indicated by the arrow "B." A magnetic trace 68 is thus formed between the flux fields A and B established upon the continuous belt 34. This magnetic trace 68 is actually the absence of a magnetized signal which shifts up and down in FIG. 10, along the continuous belt 34, as the flux null 66 shifts to the right or left in FIG. 7. Each of these aforementioned shifts are caused by a variation in the input signal applied to the terminals 40 of the coil 68. The field established by the flux patterns A and B on the continuous belt 34 passes out of the continuous belt in the area around the magnetic trace 68, as shown by the arrows 70 in FIG. 11. These arrows create a flux pattern perpendicular to the plane of the continuous belt 34 which penetrates the recording medium 22 as the continuous belt contacts that medium. Thus, the flux field reorients the reflective magnetic flake-like particles 43 within the magnetic recording medium 22, as shown in FIG. 12. Reorientation of the reflective flake-like particles creates an area which absorbs the visual wavelengths of the ambient light, while the remaining preoriented portions of the magnetic recording medium unaffected by the belt 34 reflect the visual wavelengths. This absorption-reflection characteristic of the recording medium 22 creates a contrast which provides the visual display for the recorded input signal.

Referring now to FIG. 13, a recording apparatus similar to that disclosed in FIG. 3 is shown. This recording apparatus 20 is capable of recording upon a continuous thermosetting web member 72 having highly reflective flake-like particles 43 therein. The thermosetting recording medium 72 is supplied from a supply reel 24 and drawn across the recording drum 46 by driving rollers 48. The signal recorded upon the thin magnetic film material of the drum 46 influences the recording medium 72 for reorienting the magnetic, reflective flake-like particles therein and creating a recording thereon. After the recording has been created, a heat element 74 applies heat to the thermosetting recording medium 72 for setting the reoriented magnetic flake-like particles in a fixed position thereby permanently recording the input signal upon the recording medium 72. The erase head 44 then removes the recorded signal from the drum so that the drum may be reused for continuously recording the input signal.

FIG. 14 discloses a recording device similar to that disclosed in FIG. 13. Here, the recording medium is a thermoplastic recording medium 76 which is heated by a heating element 74 prior to being driven across the drum 46 by the driving rollers 48. As in FIG. 13, the recording heads 38 records the input signal upon the thin magnetic film material of the drum 46. As the thermoplastic recording medium 76 is reeled from the supply reel 24, it passes the heating element 74 where enough heat is applied to free the reflective, magnetic flake-like particles therein to react to an appropriate external force. The flake-like particles are then reoriented by the magnetic flux establishing recorded input signals upon the drum 46. The drum surface itself is sufficient to provide the cooling for resetting the thermoplastic material and for permanently holding the reflective flake-like particles in their reoriented position. As an alternative, a cooling element, such as a fan, may be provided for cooling the thermoplastic recording medium.

The magnetic null head 38 utilized within the present invention is arranged with the recording gap 58 as wide as the recording medium 22. Through this arrangement, an analog signal is placed upon the continuous belt 34 without utilizing moving parts, except those necessary to provide the movement of the belt and recording medium. If it is desired to provide a fault recorder, the position of the recording and erase heads 38 and 44, may be reversed, as shown in FIG. 14. In this condition, the input signal is continuously recorded by the recording head 38 and then erased by the erase head 44. Should an event occur of which a recording is desired, the erase head 44 is turned off by a fault sensor 78 and the recording medium 22 is placed into motion. Motion of the recording medium 22 is achieved by spring loading the driving roller 48. Once the recording medium is in motion, the previously recorded signal upon the drum 46 is allowed to pass in contact with the recording medium 22 for recording thereon. The signal is then erased by a second erase head 80 as described before. As the recording medium also embodies the advantage of an immediate visual display, the present invention can be utilized within a fault recorder which is capable of providing the monitoring signal. In this arrangement, an operator inactivates the erase head and allows the signal to be displayed upon the recording medium. The operator can then reset the recording device for allowing the erase head to continuously erase the recorded signal until the occurrence of an event to be recorded. At this time, the erase head is automatically inactivated and the event recorded, including information from a short time prior to that event. The amount of the recorded information prior to the event is determined by the distance between the record and erase heads, 38 and 44, and the speed at which the drum 46 is rotating.

The present invention creates a magnetic recording apparatus capable of recording an input signal at high linear speeds. If the recording medium 22 were brought into direct contact with the recording head 38, the linear recording speed of recording medium 22 would be limited by the response time thereof. However, the utilization of the thin magnetic film material on the continuous belt 34 or drum 46 allows the recording medium 22 to contact the thin magnetic film material having a high remanence for an extended period of time. This enables the linear recording speed thereof to be determined by the thin magnetic film material and not by the recording medium. Further, as pointed out hereinabove, the recording medium 22 responds by reorienting the reflective flake-like particles 43. In the absence of the thin magnetic film material on the belt 34 or drum 46, a null head would create a negative trace upon the recording medium. That is, the magnetic flake-like particles 43 would reorient in all areas but the null 66. The use of the belt 34 or drum 46 allows the null to establish an area of flux 63 perpendicular to the recording medium for affecting that area only and establishing a positive trace upon the recording medium 22.

Obviously, many modifications and variations of the present invention will become apparent to those skilled in the art in light of the above teachings; and, consequently, the present invention should be limited only by the appended claims.

The embodiments of the invention in which an exclusive property or privilege is claimed are defined as follows:

1. Magnetic recording apparatus for recording and displaying an input signal comprising:

magnetic transducer means for receiving said input signal;

magnetic means including a thin magnetic film material having a high remanence for recording said input signal received by said magnetic transducer means;

a recording medium responsive to a magnetic field, and contacting said magnetic means for reproducing said recorded input signal thereon as a recorded visible display;

said recording medium including a continuous web member having highly reflective, magnetic and flake-like particles visible therein;

means for removing said recorded input signal from said magnetic means thereby readying said magnetic means for further recording of said input signal;

whereby said input signal is recorded and displayed upon said recording medium as a visible trace;

second magnetic transducer means for receiving a second input signal;

second magnetic means including a thin magnetic film material having a high remanence for recording said second input signal received by said second magnetic transducer means;

said second magnetic means contacting said recording medium on the other side of said recording medium from said first-mentioned magnetic means; and second means for removing said recorded input signal from said second magnetic means thereby readying said second magnetic means for further recording of said second input signal;

whereby said second input signal is recorded and displayed as a visible trace upon said recording medium concurrently with said first-mentioned input signal.

2. Magnetic recording apparatus as claimed in claim 1 wherein said second magnetic means includes continuous belt means constructed of said magnetic material; and rotational means for mounting said continuous belt means in contact with said second magnetic transducer means, said recording medium and said second means for removing said input signal.

3. Magnetic recording apparatus as claimed in claim 1 wherein said second magnetic means includes drum means rotatively mounted for contacting said second transducer means, said recording medium and said second means for removing said input signal.

* * * * *